US012613493B2

(12) United States Patent (10) Patent No.: US 12,613,493 B2
Park et al. (45) Date of Patent: Apr. 28, 2026

(54) HOLOGRAM SHEET AND HOLOGRAM DISPLAY APPARATUS INCLUDING THE SAME

(71) Applicant: Electronics and Telecommunications Research Institute, Daejeon (KR)

(72) Inventors: Jae Gyu Park, Daejeon (KR); Sung Il Kim, Daejeon (KR); Sung Hoon Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 18/441,340

(22) Filed: Feb. 14, 2024

(65) Prior Publication Data

US 2024/0272585 A1 Aug. 15, 2024

(30) Foreign Application Priority Data

Feb. 14, 2023 (KR) ........................ 10-2023-0019475
May 26, 2023 (KR) ........................ 10-2023-0068431

(51) Int. Cl.
  *G03H 1/00* (2006.01)
  *G02B 30/35* (2020.01)
  *G02B 30/36* (2020.01)
(52) U.S. Cl.
  CPC ........... *G03H 1/0005* (2013.01); *G02B 30/35* (2020.01); *G02B 30/36* (2020.01); *G03H 2001/0088* (2013.01); *G03H 2223/18* (2013.01); *G03H 2223/19* (2013.01); *G03H 2223/24* (2013.01)

(58) Field of Classification Search
  CPC ......... G03H 1/0005; G03H 2001/0088; G03H 2223/18; G03H 2223/19; G03H 2223/24; G02B 30/35; G02B 30/36; G02B 30/56
  See application file for complete search history.

(56) References Cited

U.S. PATENT DOCUMENTS

| | | | |
|---|---|---|---|
| 10,365,769 B2 | 7/2019 | Otsubo | |
| 10,761,342 B2 | 9/2020 | Kim et al. | |
| 11,575,879 B2 | 2/2023 | Yang et al. | |
| 2006/0092158 A1* | 5/2006 | Shestak .................. | G02B 30/56 |
| | | | 345/424 |
| 2007/0165013 A1* | 7/2007 | Goulanian ........... | H04N 13/398 |
| | | | 348/E13.032 |
| 2011/0317262 A1* | 12/2011 | Hsu ....................... | H04N 13/351 |
| | | | 359/463 |
| 2014/0198364 A1* | 7/2014 | Son ......................... | G02B 30/10 |
| | | | 359/23 |
| 2015/0077399 A1* | 3/2015 | Nishioka ............. | G06F 3/04815 |
| | | | 345/175 |

(Continued)

FOREIGN PATENT DOCUMENTS

| | | |
|---|---|---|
| JP | 2017-26734 A | 2/2017 |
| JP | 2022-63376 A | 4/2022 |

(Continued)

*Primary Examiner* — Fernando Alcon
(74) *Attorney, Agent, or Firm* — Sughrue Mion, PLLC

(57) ABSTRACT

The present disclosure relates to a holographic sheet and a hologram display apparatus including the same. The hologram sheet may include a prism array configured to refract light incident from the outside, and a reflective sheet disposed to face the prism array and configured to reflect the light refracted by the prism array and generate a floating image.

20 Claims, 11 Drawing Sheets

(56)     References Cited

U.S. PATENT DOCUMENTS

| 2015/0336340 | A1  |    | 11/2015 | Otsubo | |
|---|---|---|---|---|---|
| 2017/0219838 | A1 | * | 8/2017 | Yang | G02B 30/36 |
| 2017/0227928 | A1 | * | 8/2017 | Suginohara | G03H 1/2202 |
| 2017/0235114 | A1 | * | 8/2017 | Suginohara | G02B 27/10 |
| | | | | | 359/631 |
| 2020/0026091 | A1 | * | 1/2020 | Nykerk | F21S 43/26 |
| 2022/0155614 | A1 | * | 5/2022 | Kikuta | H04N 13/366 |
| 2022/0397762 | A1 | * | 12/2022 | Bae | G02B 27/0018 |
| 2022/0397859 | A1 |  | 12/2022 | Choi et al. | |
| 2022/0397860 | A1 |  | 12/2022 | Hong et al. | |
| 2023/0035023 | A1 | * | 2/2023 | Kikuta | H04N 13/122 |
| 2023/0258955 | A1 |  | 8/2023 | Daiku | |
| 2023/0305313 | A1 | * | 9/2023 | Hsu | G02B 5/045 |
| 2024/0142799 | A1 | * | 5/2024 | Akimoto | G02B 30/56 |
| 2024/0280830 | A1 | * | 8/2024 | Kikuta | G09G 3/3413 |
| 2025/0093679 | A1 | * | 3/2025 | Qiao | G02B 30/33 |

FOREIGN PATENT DOCUMENTS

| KR | 10-1237500 | B1 |  | 2/2013 | | |
|---|---|---|---|---|---|---|
| KR | 10-2016-0042804 | A |  | 4/2016 | | |
| KR | 10-2017-0078838 | A |  | 7/2017 | | |
| KR | 10-2018-0076541 | A |  | 7/2018 | | |
| WO | WO-2009097746 | A1 | * | 8/2009 | | G02B 30/25 |
| WO | WO-2012025786 | A1 | * | 3/2012 | | H04N 13/359 |
| WO | WO-2018154849 | A1 | * | 8/2018 | | G02B 30/56 |
| WO | WO-2020170246 | A1 | * | 8/2020 | | G02B 30/28 |
| WO | WO-2021177271 | A1 | * | 9/2021 | | G02B 30/56 |
| WO | WO-2022080173 | A1 | * | 4/2022 | | G06F 3/0421 |

* cited by examiner

R 310    310    310

200    100

A

10

X

Y

HOLOGRAM SHEET AND HOLOGRAM DISPLAY APPARATUS INCLUDING THE SAME

CROSS-REFERENCE TO RELATED APPLICATION

This application claims priority to and the benefit of Korean Patent Application No. 10-2023-0019475 filed on Feb. 14, 2023, and Korean Patent Application No. 10-2023-0068431 filed on May 26, 2023, the disclosure of which is incorporated herein by reference in its entirety.

BACKGROUND

1. Field of the Invention

The present disclosure relates to a hologram sheet and a hologram display apparatus including the same, and more specifically, to a hologram sheet which may be miniaturized by reducing a volume, and a hologram display apparatus including the same.

2. Discussion of Related Art

Recently, there has been a great demand for technologies to display and sense holographic images in a free space in the fields of augmented reality (AR)/virtual reality (VR), Metaverse, and medical care (for tracking affected areas and operating thereon).

Holograms can be implemented in various ways, and among them, hovering hologram technologies project a display image onto a hologram sheet based on light sources such as liquid crystal displays (LCDs) or light-emitting diodes (LEDs) and display hologram images at a position at which an incident angle and a distance are identically symmetrical. Such a hovering hologram technology may be fused with a touch sensor technology to detect a touch position in a free space and implement a realistic hologram by applying touch algorithms and operation modules, thereby having great potential for application in the fields of AR/VR, Metaverse, and medical care (for tracking affected areas and operating thereon).

Conventional hologram display apparatuses have a limitation in that a volume thereof is structurally increased because a display apparatus and a hologram sheet should maintain an angle of about 45 degrees in order to form a holographic image in a free space.

SUMMARY OF THE INVENTION

The present disclosure is directed to providing a hologram sheet and a hologram display apparatus which can be miniaturized by reducing a volume.

According to an aspect of the present disclosure, there is provided a hologram sheet including a prism array configured to refract light incident from the outside, and a reflective sheet disposed to face the prism array and configured to reflect the light refracted by the prism array and generate a floating image.

The prism array may include a plurality of microprisms arranged in a first direction on one surface of the reflective sheet.

The plurality of microprisms may be disposed parallel to each other.

The microprism may have a triangular cross-sectional shape.

The reflective sheet may generate the floating image in a space positioned at a side opposite to the prism array.

The reflective sheet may include a first reflective member having a first reflective surface, and a second reflective member disposed to face the first reflective member and having a second reflective surface disposed perpendicular to the first reflective surface.

The light refracted by the prism array may be incident on the first reflective member in a direction inclined with respect to the first reflective surface.

According to another aspect of the present disclosure, there is provided a hologram sheet including a prism array configured to refract light incident from the outside, a reflective sheet disposed to face the prism array and configured to reflect the light refracted by the prism array and generate a floating image, and a lens array disposed to face the reflective sheet and configured to adjust a position of the floating image generated by the reflective sheet.

The prism array may include a plurality of microprisms arranged in a first direction on one surface of the reflective sheet, and the lens array may include a plurality of microlenses arranged in the first direction on the other surface of the reflective sheet.

The plurality of microlenses may be arranged in at least two lines in a longitudinal direction of the microprism.

The microlens may have a form of a concave lens.

The plurality of microlenses may have different curvatures.

The curvature of the plurality of microlenses may increase or decrease in the first direction.

According to still another aspect of the present disclosure, there is provided a hologram display apparatus including a display, a hologram sheet including a prism array configured to refract light incident from the display, and a reflective sheet disposed to face the prism array and configured to reflect the light refracted from the prism array and generate a floating image, and a detection member configured to detect a touch input on the floating image.

The display may be disposed parallel to the reflective sheet.

The detection member may radiate detection light to the floating image in a direction parallel to the floating image.

The hologram sheet may further include a lens array disposed to face the reflective sheet and configured to adjust a position of the floating image generated by the reflective sheet.

The prism array may include a plurality of microprisms arranged in a first direction on one surface of the reflective sheet, and the lens array may include a plurality of microlenses arranged in the first direction on the other surface of the reflective sheet.

The microlens may have a form of a concave lens, and the plurality of microlenses may have different curvatures.

The detection member may further include a support member disposed to be inclined with respect to the first direction and configured to support the detection member with respect to the hologram sheet.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
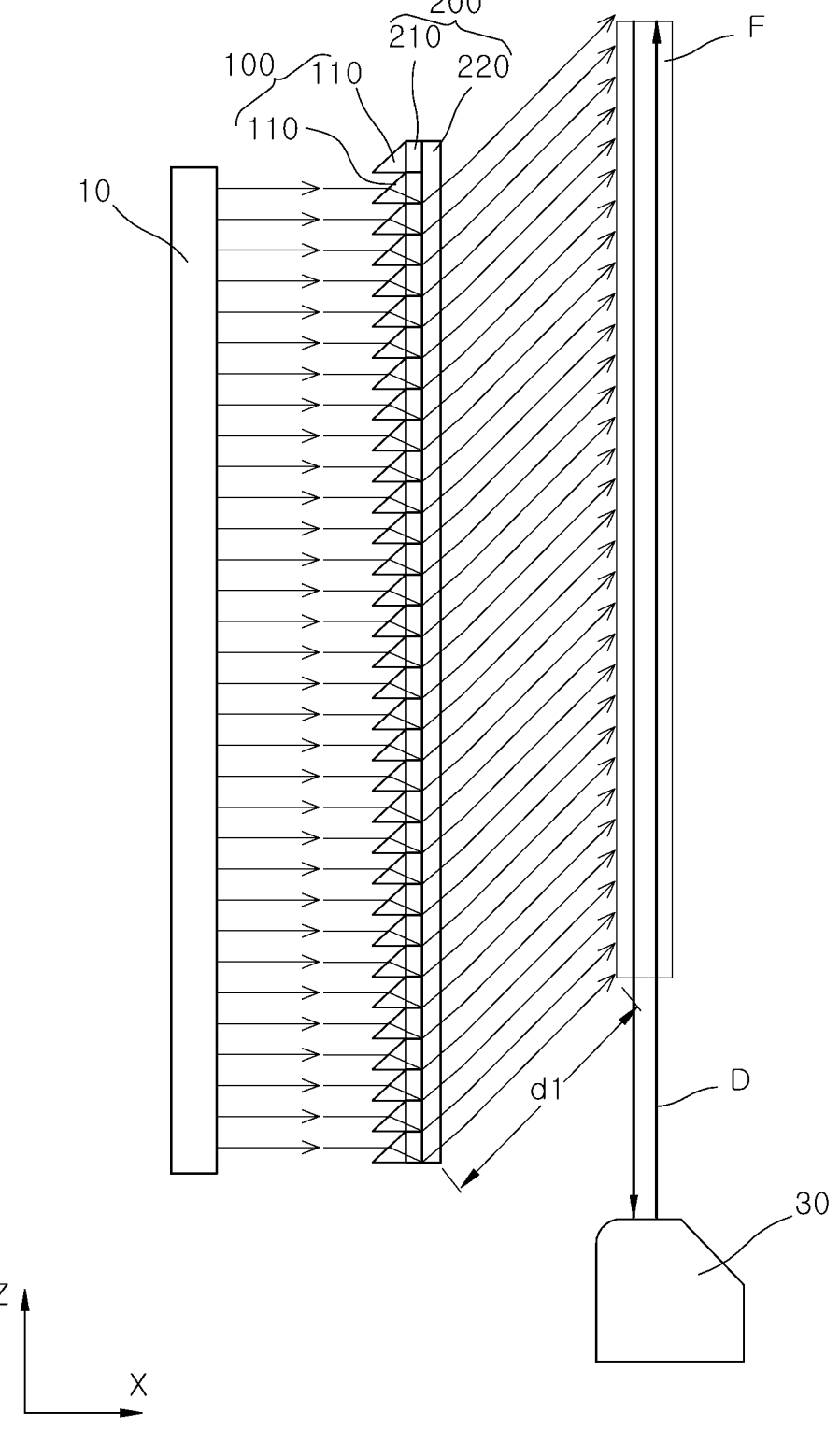
FIG. 1 is a schematic view illustrating a configuration of a hologram display apparatus according to a first embodiment of the present disclosure.

Hereinafter, embodiments of a hologram sheet and a hologram display apparatus including the same according to the present disclosure will be described with reference to the accompanying drawings.

The accompanying drawings are not necessarily to scale and in some instances, may have been exaggerated in thickness of lines or sizes of components in order to clearly illustrate features of the embodiments. Further, terms to be described below are terms defined in consideration of functions in the present disclosure and thus may vary according to intentions or customs of users and operators. Accordingly, the definitions of such terms should be made based on the content throughout the specification.

In addition, in the present specification, it will be understood that when a portion is referred to as being "connected (or coupled)" to another portion, it can be directly connected (or coupled)" to the another portion or intervening elements may be present. In the present the specification, unless explicitly described to the contrary, the word "comprise" or "include" and a variation such as "comprising" or "including" will be understood to imply the inclusion of stated elements but not the exclusion of any other elements.

In addition, like reference numerals refer to the like elements throughout this specification. Even if the same or similar reference symbols are not mentioned or described with reference to specific drawings, the symbols may be described based on other drawings. In addition, even if there are portion that are not indicated by reference signs in specific drawings, the portions may be described based on other drawings. In addition, the numbers, shapes, sizes, and relative differences in size of detailed components included in the drawings of the present application are set for convenience of understanding, do not limit the embodiments, and may be implemented in various forms.

FIG. 1 is a schematic view illustrating a configuration of a hologram display apparatus according to a first embodiment of the present disclosure.

Referring to FIG. 1, the hologram display apparatus according to the present embodiment may include a display 10, a hologram sheet 20, and a detection member 30.

The display 10 outputs an image for generating a floating image F. The display 10 according to the present embodiment may be formed to have a panel shape. The display 10 may be disposed parallel to the hologram sheet 20 which will be described below. Accordingly, the overall volume of the hologram display apparatus can be considerably reduced compared to a case in which the display 10 is disposed to be inclined with respect to the hologram sheet 20.

The display 10 may convert electromagnetic signals into optical signals to output images. More specifically, the display 10 may include a plurality of pixels that radiate light toward the hologram sheet 20. The plurality of pixels may be arranged in a grid form on one surface of the display 10 facing the hologram sheet 20. An image output by the display 10 may be generated by combining pieces of light radiated by the plurality of pixels. Each pixel may include subpixels such as light-emitting diodes (LEDs) that radiate red, green, and blue (RGB) light.

The hologram sheet 20 uses light incident from the display 10 to generate the floating image F in an external space.

Figure 2:
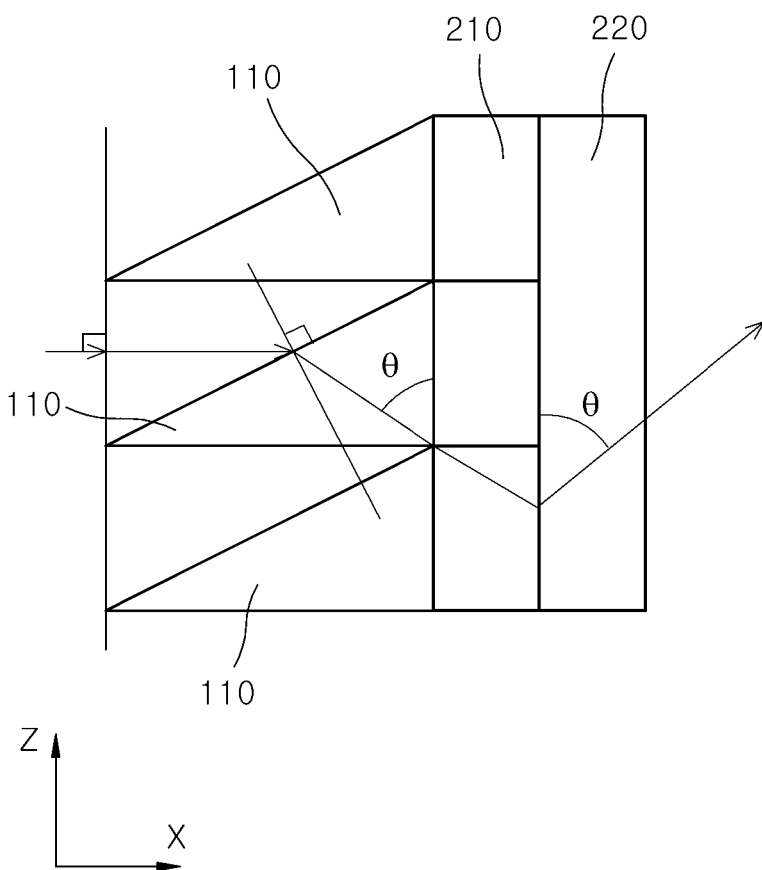
FIG. 2 is a schematic side view illustrating a configuration of a hologram sheet according to the first embodiment of the present disclosure.
Figure 3:
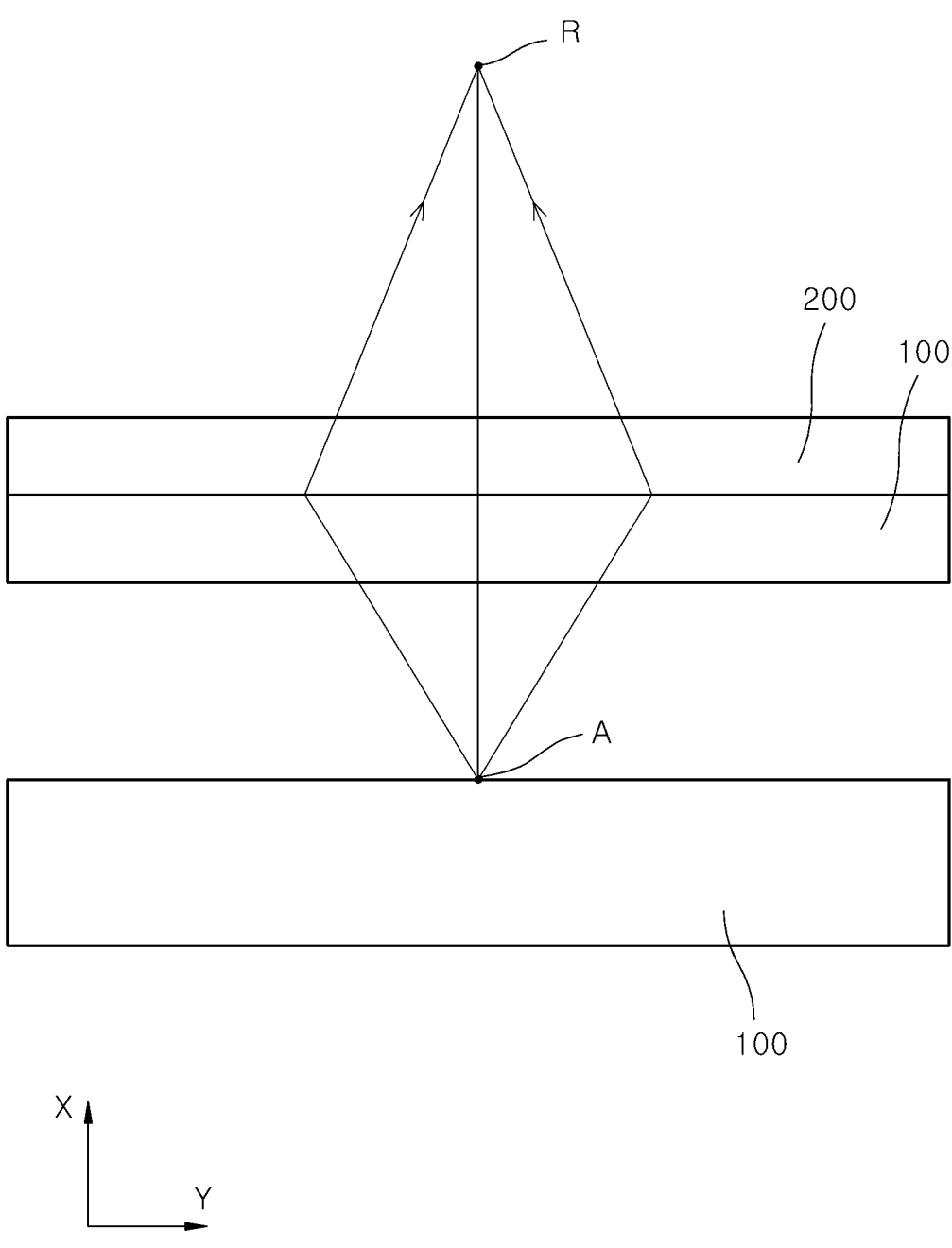
FIG. 3 is a schematic plan view illustrating the configuration of the hologram sheet according to the first embodiment of the present disclosure.

FIG. 2 is a schematic side view illustrating a configuration of the hologram sheet according to the first embodiment of the present disclosure. FIG. 3 is a schematic plan view illustrating the configuration of the hologram sheet according to the first embodiment of the present disclosure.

Referring to FIGS. 2 and 3, the hologram sheet 20 according to the present embodiment may include a prism array 100 and a reflective sheet 200.

The prism array 100 refracts light incident from the outside, such as the display 10. That is, the prism array 100 may function as a component that causes light received from the display 10 to be incident in a state of being inclined at a certain angle with respect to the reflective sheet 200. Accordingly, the prism array 100 may guide the display 10 and the reflective sheet 200 to maintain a parallel state.

Figure 4:
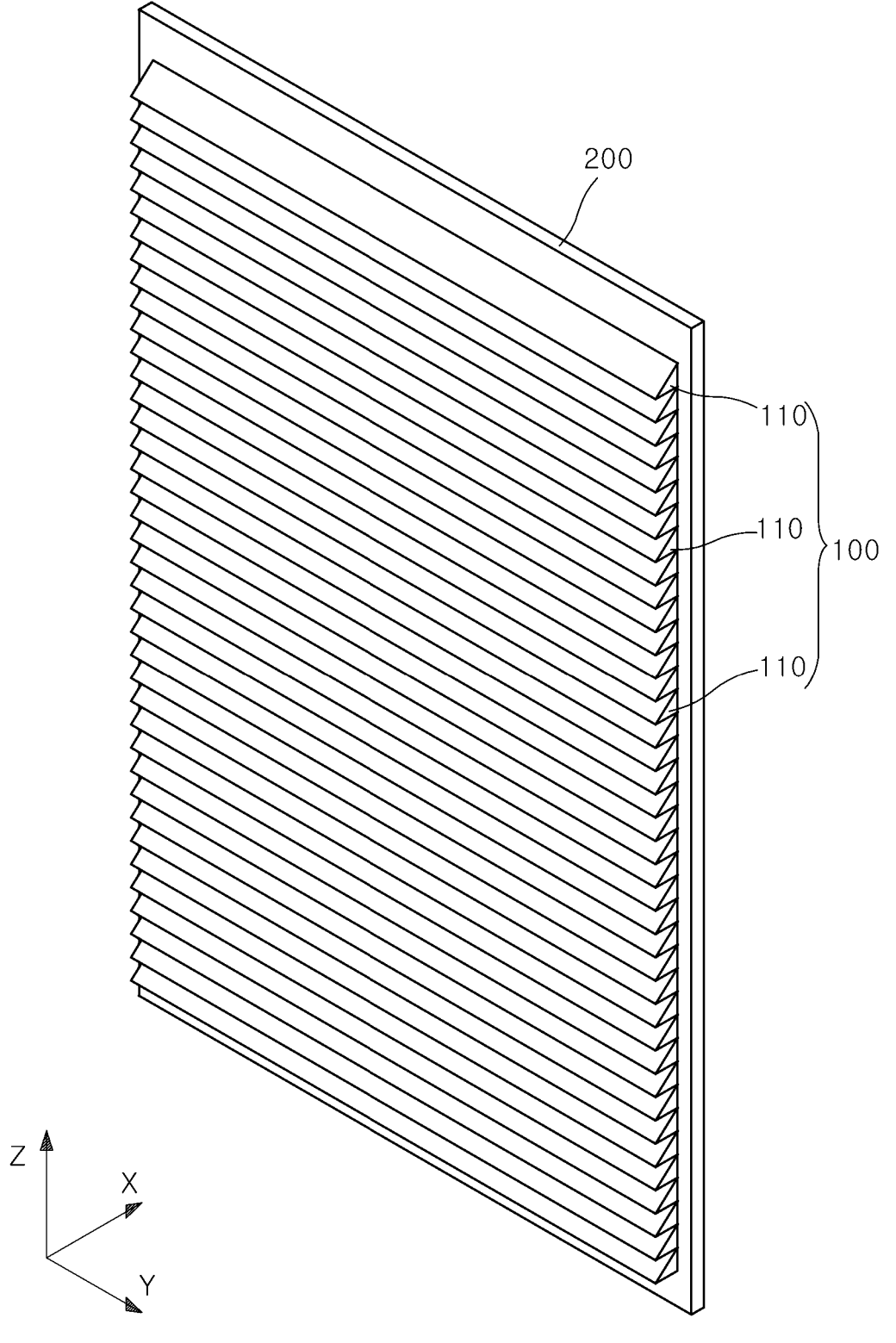
FIG. 4 is a schematic view illustrating a configuration of a prism array according to the first embodiment of the present disclosure.

FIG. 4 is a schematic view illustrating a configuration of the prism array according to the first embodiment of the present disclosure.

Referring to FIG. 4, the prism array 100 according to the present embodiment may include a plurality of microprisms 110.

The microprism 110 may be exemplified as various types of prisms having a triangular cross section. An angle of an inclined surface of the microprism 110, a refractive index thereof, or the like may be designed and changed in various ways according to a size of the display 10, a distance from the display 10, and the like. The microprism 110 may be disposed such that the inclined surface faces the display 10.

The plurality of microprisms 110 may be arranged in a line in a first direction on one surface (a left surface in FIG. 1) of the reflective sheet 200. The first direction may be exemplified as a direction parallel to a Z-axis in FIGS. 1 to 4. However, the first direction is not limited thereto and may be designed and changed into any one of directions parallel to the reflective sheet 200. The plurality of microprisms 110 may be disposed such that longitudinal directions thereof are parallel to each other. The longitudinal direction of the microprism 110 may be parallel to a Y-axis direction in FIG. 4.

The reflective sheet 200 is disposed to face the prism array 100 and reflects light refracted by the prism array 100 to generate the floating image F in a space. As an example, the reflective sheet 200 may generate the floating image F in a space positioned at a side opposite to the prism array 100.

Figure 5:
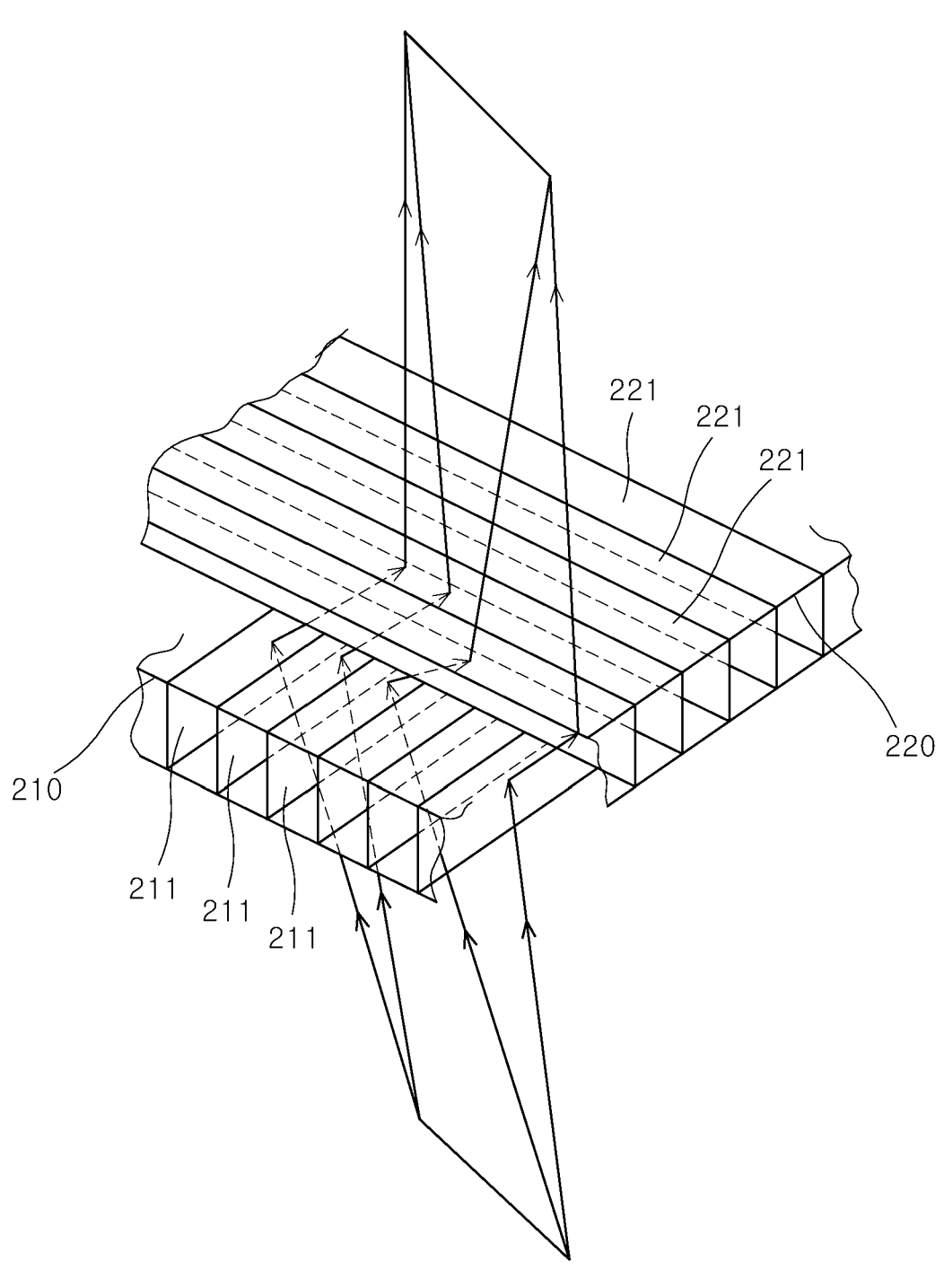
FIG. 5 is a schematic view illustrating a configuration of a reflective sheet according to the first embodiment of the present disclosure.

FIG. 5 is a schematic view illustrating a configuration of the reflective sheet according to the first embodiment of the present disclosure.

Referring to FIG. 5, the reflective sheet 200 according to the present embodiment may include a first reflective member 210 and a second reflective member 220.

The first reflective member 210 forms an exterior of one side of the reflective sheet 200 and is disposed to face the display 10. The first reflective member 210 may be formed to have an approximately rectangular parallelepiped box shape. The first reflective member 210 may be made of a transparent material. One surface (a left surface in FIG. 1) of the first reflective member 210 may be disposed parallel to the display 10. The plurality of microprisms 110 may be fixed to and supported on one surface of the first reflective member 210 by an adhesive or the like. Light refracted by the microprism 110 may be incident on the first reflective member 210 in a state of being inclined at a certain angle with respect to one surface of the first reflective member 210.

A first reflective surface 211 may be formed on the first reflective member 210. The first reflective surface 211 may be formed to have the form of a partition wall that partitions an internal space of the first reflective member 210. The first reflective surface 211 may be formed by depositing aluminum or silver on one surface of a panel having a flat plate shape. A light absorption film (not shown) may be formed on a surface opposite to the first reflective surface 211. The light absorption film may be formed by depositing a matte black paint or the like on the surface opposite to the first reflective surface 211 or by bringing a black sheet into close contact with the surface.

A plurality of first reflective surfaces 211 may be formed. The first reflective surfaces 211 may be arranged in a line in one direction inside the first reflective member 210. Light refracted by the prism array 100 may be incident on the first reflective member 210 in a direction inclined at a certain angle with respect to the first reflective surface 211. Here, one direction in which the plurality of first reflective surfaces 211 are arranged may be designed and changed in various ways in a range in which the light refracted by the prism array 100 may be incident obliquely.

The second reflective member 220 may form an exterior of the other side of the reflective sheet 200 and may be disposed to face the first reflective member 210. The second reflective member 220 may be formed to have the same rectangular parallelepiped box shape as the first reflective member 210. The second reflective member 220 may be made of a transparent material. One surface of the second reflective member 220 may be fixed to the other surface of the first reflective member 210, that is, the remaining surface of both surfaces of the first reflective member 210 on which the prism array 100 is not fixed. That is, the first reflective member 210 and the second reflective member 220 may be stacked in a traveling direction of light incident from the display 10, more specifically, in an X-axis direction in FIGS. 1 and 2.

A second reflective surface 221 may be formed on the second reflective member 220. The second reflective surface 221 may be formed to have the form of a partition wall that partitions an internal space of the second reflective member 220. The second reflective surface 221 may be formed by depositing aluminum or silver on one surface of a panel having a flat plate shape. A light absorption film (not shown) may be formed on a surface opposite to the second reflective surface 221. The light absorption film may be formed by depositing a matte black paint or the like at the surface opposite to the second reflective surface 221 or by bringing a black sheet into close contact with the surface. The second reflective surface 221 may be disposed perpendicular to the first reflective surface 211.

A plurality of second reflective surfaces 221 may be formed. The plurality of second reflective surfaces 221 may be arranged in a line in a direction perpendicular to the first reflective surface 211 inside the second reflective member 22. The second reflective surface 221 reflects light reflected by the first reflective surface 211 again toward an external space of the second reflective member 220. Since the second reflective surface 221 is disposed perpendicular to the first reflective surface 211, light incident on the first reflective surface 211 at a set angle θ may be emitted from the second reflective surface 221 at the same angle.

When a process of generating the floating image F by the reflective sheet 200 is described in more detail with reference to FIGS. 1 to 5, light generated from the display 10 passes through the microprism 110 to be incident on the first reflective surface 211, and the light incident on the first reflective surface 211 is reflected toward the second reflective surface 221.

Thereafter, light reflected by the first reflective surface 211 is reflected from the second reflective surface 221 at the same angle as an incident angle with respect to the first reflective surface 211 and is projected onto a space positioned at a side opposite to the display 10 with respect to the reflective sheet 200.

Pieces of light emitted at different angles from any point A of the display 10 may converge at a position spaced a first set distance d1 apart from the second reflective member 220 by the second reflective surface 221 to form a real image R.

Pieces of light emitted from different points of the display 10 through such a process forms real images at different positions. By combining the real images, the floating image F, identical to an image output by the display 10, may be generated in a space.

Meanwhile, as shown in FIG. 1, the display 10 may be disposed parallel to the reflective sheet 200, and distances by which pieces of light emitted from the different points of the display 10 travel to form real images are all the same, and thus the floating image F may be disposed parallel to the display 10 at a position spaced apart from the second reflective member 220 by the first set distance d1.

The detection member 30 detects a touch input on the floating image F generated by the hologram sheet 20. The detection member 30 according to the present embodiment may include a light-emitting unit that radiates detection light D toward the floating image F, and a light-receiving unit that receives the detection light D reflected from a user's finger when a user performs a touch operation on the floating image F and thus may be exemplified as a near-infrared sensor or a line laser sensor which may detect whether a user touches the floating image F and a position. The detection member 30 may radiate the detection light D to the floating image F in a direction parallel to the floating image F. Accordingly, the detection light D may pass through the floating image F in the direction parallel to the floating image F.

Hereinafter, a hologram display apparatus according to a second embodiment of the present disclosure will be described.

Figure 6:
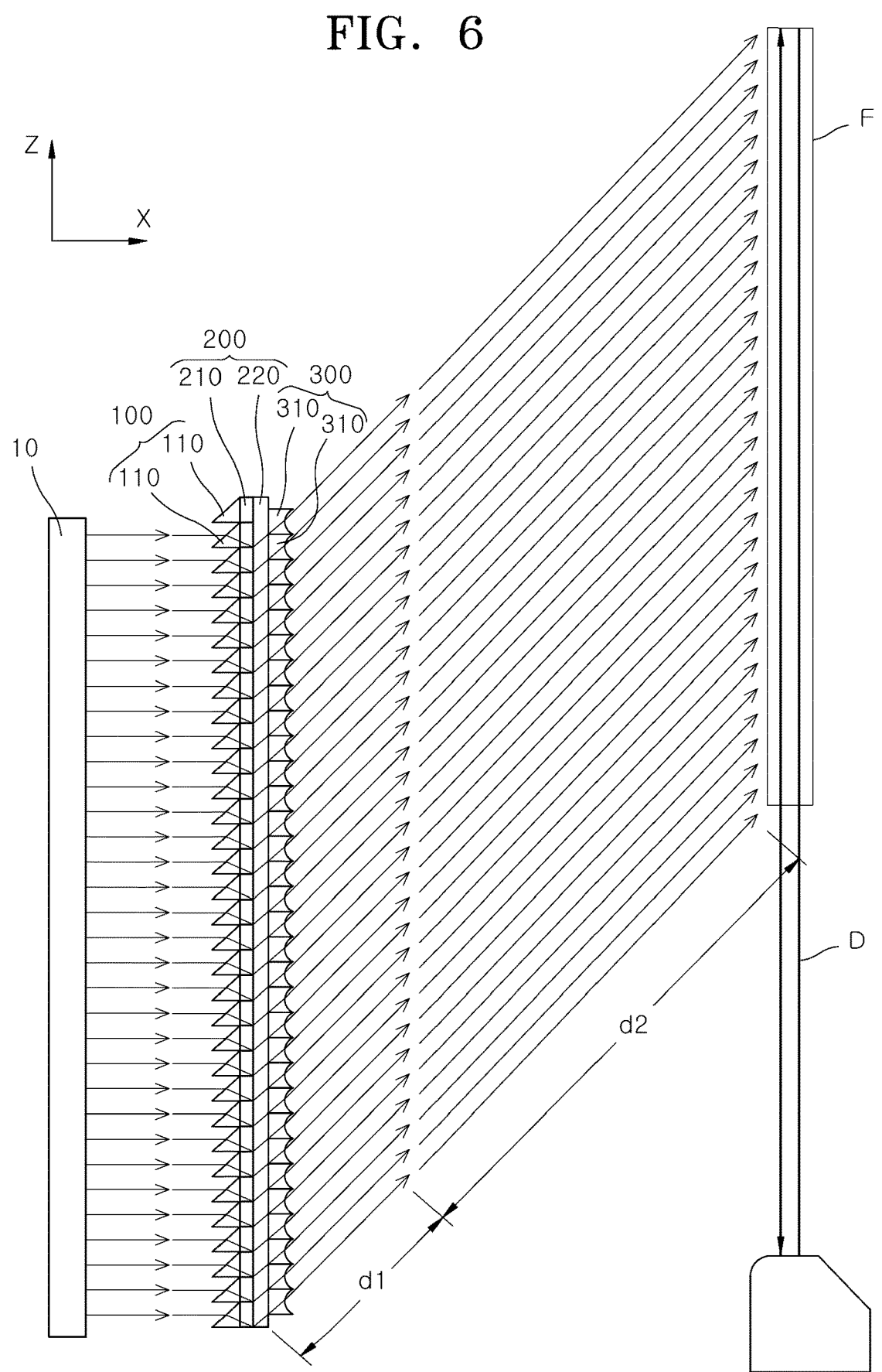
FIG. 6 is a schematic view illustrating a configuration of a hologram display apparatus according to a second embodiment of the present disclosure.
Figure 7:
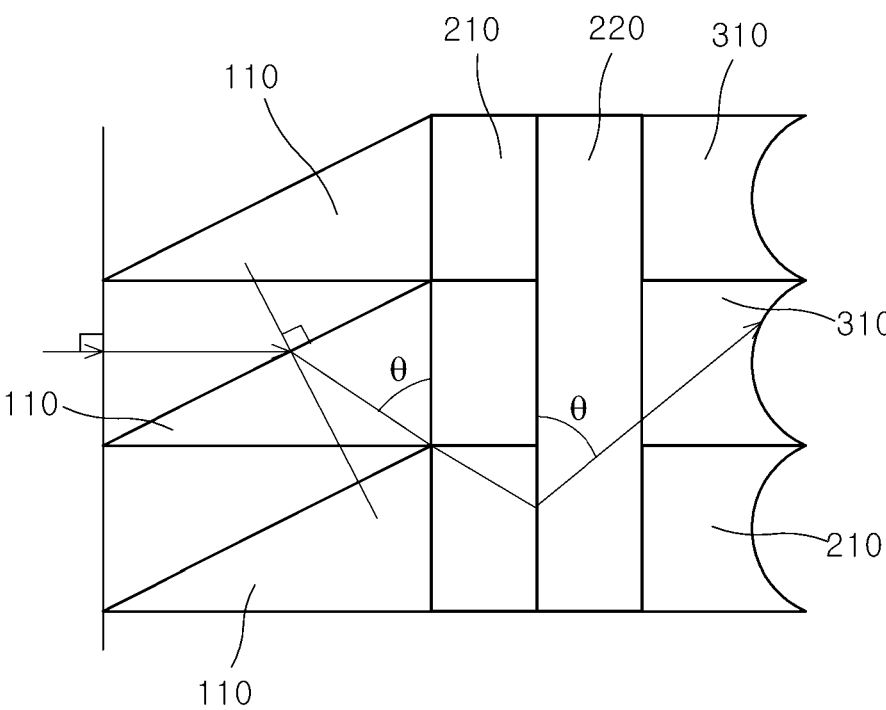
FIG. 7 is a schematic side view illustrating a configuration of a reflective sheet according to the second embodiment of the present disclosure.
Figure 7:
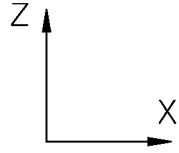
Figure 8:
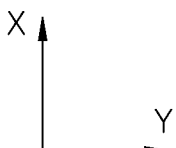
FIG. 8 is a schematic plan view illustrating the configuration of the reflective sheet according to the second embodiment of the present disclosure.

FIG. 6 is a schematic view illustrating a configuration of the hologram display apparatus according to the second embodiment of the present disclosure. FIG. 7 is a schematic side view illustrating a configuration of a reflective sheet according to the second embodiment of the present disclosure. FIG. 8 is a schematic plan view illustrating the configuration of the reflective sheet according to the second embodiment of the present disclosure.

Referring to FIGS. 6 to 8, the hologram display apparatus according to the present embodiment may include a display 10, a hologram sheet 20, and a detection member 30.

The hologram display apparatus according to the present embodiment may be different from the hologram display apparatus according to the first embodiment of the present disclosure only in a detailed configuration of the hologram sheet 20. Accordingly, hereinafter, in describing the hologram display apparatus according to the present embodiment, only the detailed configuration of the hologram sheet 20, which is different from that of the hologram display apparatus according to the first embodiment of the present disclosure, will be described. The descriptions of the display 10, the hologram sheet 20, and the detection member 30 according to the first embodiment of the present disclosure may be applied to the remaining configurations of the display 10, the detection member 30, and the hologram sheet 20 according to the present embodiment without any change.

The hologram sheet 20 according to the present embodiment may further include a lens array 300.

The lens array 300 is disposed to face the reflective sheet 200 and adjusts a position of a floating image F generated by the reflective sheet 200. More specifically, the lens array 300 may function as a component that increases a distance between the floating image F generated by the reflective sheet 200 and the reflective sheet 200 to be longer than a first set distance d1. Accordingly, the lens array 300 can prevent an increase in volume of the hologram display apparatus by positioning the floating image F at a relatively remote position without increasing a distance between the display 10 and the hologram sheet 20.

Figure 9:
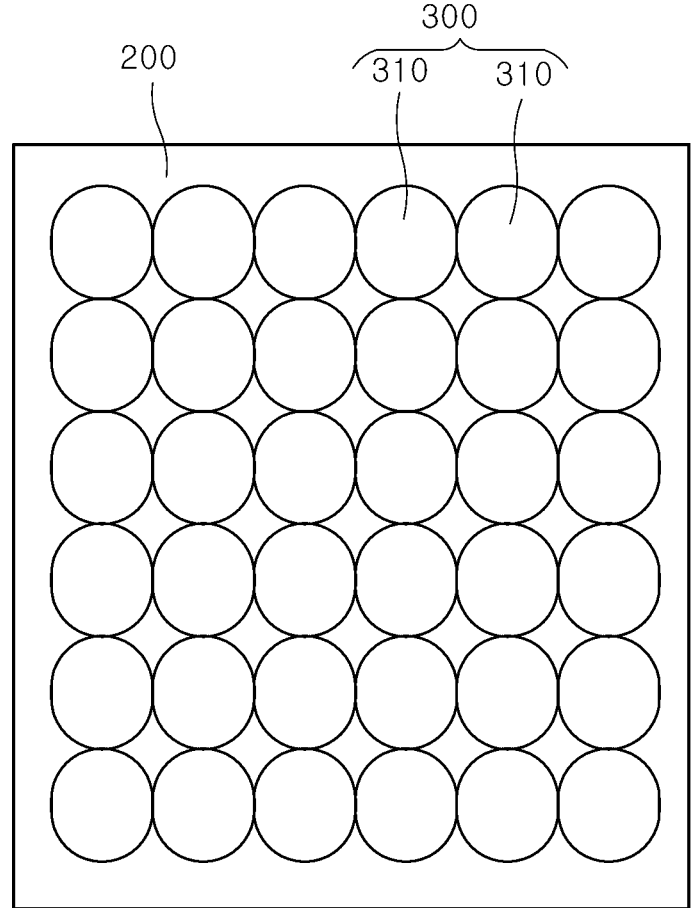
FIG. 9 is a schematic view illustrating a configuration of a lens array according to the second embodiment of the present disclosure.
Figure 9:
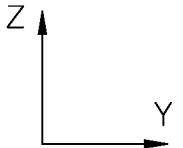

FIG. 9 is a schematic view illustrating a configuration of the lens array according to the second embodiment of the present disclosure.

Referring to FIGS. 6 to 9, the lens array 300 according to the present embodiment may include microlenses 310.

The microlens 310 may be formed to have the form of a concave lens of which one surface is concavely recessed in a hemispherical shape. The microlens 310 may be disposed to face the prism array 100 with the reflective sheet 200 interposed therebetween. The microlens 310 may be fixed to the other surface of the reflective sheet 200, more specifically, the other surface (a right surface in FIG. 7) of a second reflective member 220 from which light reflected from the second reflective surface 221 is emitted. The microlens 310 may be disposed so that a concave surface faces an external space of the second reflective member 220.

A plurality of microlenses 310 may be provided. Like the microprisms 110, the plurality of microlenses 310 may be arranged in a line in a first direction on the other surface of the reflective sheet 200, that is, in a direction parallel to a Z axis in FIG. 6. The number of microlenses 310 arranged in the first direction may be the same as the number of microprisms 110 arranged in the first direction or may be different from the number of microprisms 110. The plurality of microlenses 310 may be arranged in at least two lines in a longitudinal direction of the microprism 110, that is, a Y-axis direction in FIG. 9. The number of microlenses 310 arranged in the longitudinal direction of the microprism 110 may be designed and changed to various numbers according to the size of the microlenses 310 and the like.

Hereinafter, a process in which the hologram sheet 20 according to the present embodiment generates the floating image F will be described.

Referring to FIGS. 6 to 9, pieces of light emitted at different angles from any point A of the display 10 pass through the reflective sheet 200 and then are incident on the microlens 310 in a direction in which the pieces of light converge on a central axis of the microlens 310.

Since the microlens 310 is formed to have the form of the concave lens, except for light passing through a center line of the microlens 310, the remaining pieces of light are refracted in an outward direction of the center line of the microlens 310.

Due to such refraction, pieces of light passing through the microlenses 310 may converge at a second set distance d2 positioned further than the first set distance d1 and may form a real image R. That is, the real image R is generated at a farther distance from the hologram sheet 20 than in a case in which the microlens 310 is not present.

Pieces of light emitted from different points of the display 10 through the same process form real images at different positions. By combining the real images, the floating image F, identical to an image output by the display 10, may be generated in a space.

Meanwhile, as shown in FIG. 6, the display 10 may be disposed parallel to the reflective sheet 200, and distances by which pieces of light emitted from the different points of the display 10 travel to form real images are all the same, and thus the floating image F may be disposed parallel to the display 10 at a position spaced apart from the second reflective member 220 by the second set distance d2.

Hereinafter, a configuration of a hologram display apparatus according to a third embodiment of the present disclosure will be described.

Figure 10:
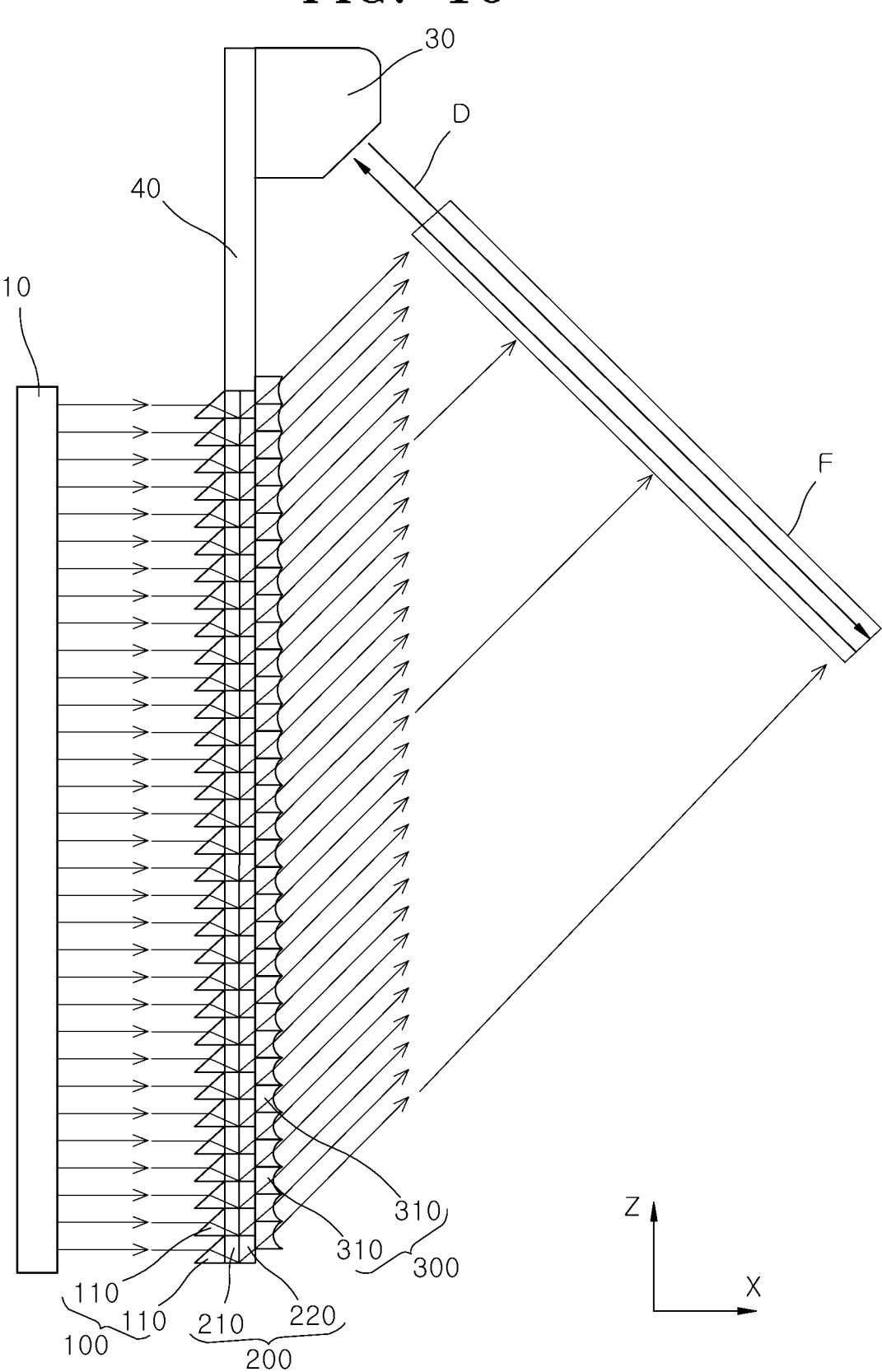
FIG. 10 is a schematic view illustrating a configuration of a hologram display apparatus according to a third embodiment of the present disclosure.
Figure 11:
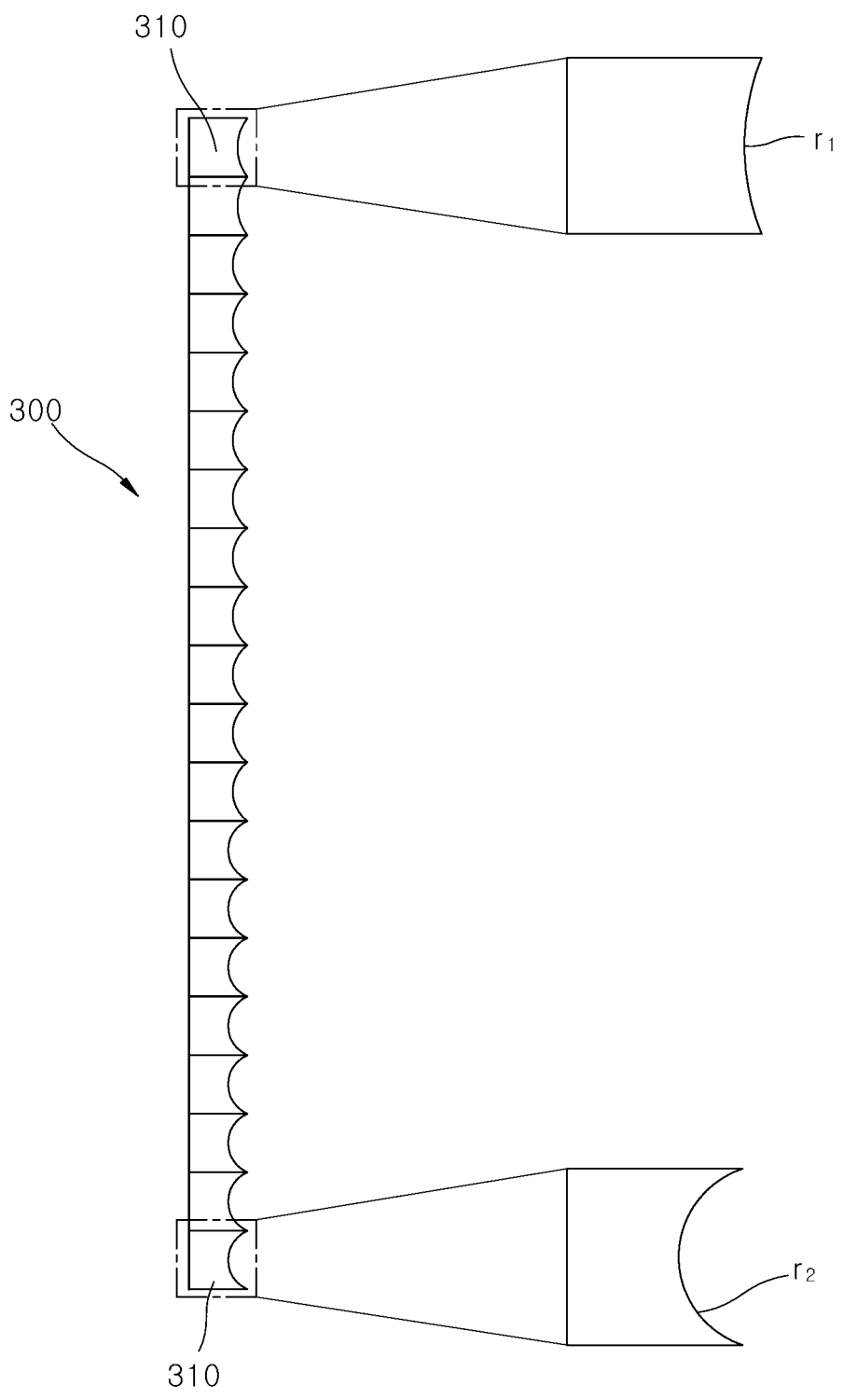
FIG. 11 is a schematic view illustrating a configuration of a lens array according to the third embodiment of the present disclosure.

FIG. 10 is a schematic view illustrating a configuration of the hologram display apparatus according to the third embodiment of the present disclosure. FIG. 11 is a schematic view illustrating a configuration of a lens array according to the third embodiment of the present disclosure.

Referring to FIGS. 10 and 11, the hologram display apparatus according to the present embodiment may include a display 10, a hologram sheet 20, a detection member 30, and a support member 40.

The hologram display apparatus according to the present embodiment may be different from the hologram display apparatus according to the second embodiment of the present disclosure in a detailed configuration of lens array 300 and may further include the support member 40. Accordingly, hereinafter, in describing the hologram display apparatus according to the present embodiment, only the detailed configuration of the lens array 300, which is different from that of the hologram display apparatus according to the second embodiment of the present disclosure, and only the support member 40 will be described. The descriptions of the display 10, the hologram sheet 20, and the detection member 30 according to the second embodiment of the present disclosure may be applied to the remaining configurations of the display 10, the detection member 30, and the hologram sheet 20 according to the present embodiment without any change.

A plurality of microlenses 310 constituting a lens array 300 according to the present embodiment may be formed to have different curvatures. More specifically, the curvature of the plurality of microlenses 310 may be formed to gradually increase or decrease in a first direction.

For example, as shown in FIGS. 10 and 11, among the plurality of microlenses 310, the curvature of the microlens 310 positioned at the uppermost end in a first direction may be formed as a first set curvature r1. In addition, among the plurality of microlenses 310, the curvature of the microlens 310 positioned at the lowermost end in the first direction may be formed as a second set curvature r2 that is greater than the first set curvature r1. The curvature of the remaining microlenses 310 disposed between the microlens 310 positioned at the uppermost end and the microlens 310 positioned at the lowermost end may gradually increase downward within a range of the first set curvature r1 and the second set curvature r2.

The curvature of the plurality of microlenses 310 is not limited to the above-described details and may be formed to gradually decrease downward. In this case, the first set curvature r1 may be formed to be greater than the second set curvature r2.

Pieces of light passing through different microlenses 310 in the first direction may generate real images at positions spaced apart from the reflective sheet 200 by different distances, and as shown in FIG. 10, a floating image F may be disposed to be inclined with respect to the display 10.

Accordingly, as compared with a case in which the plurality of microlenses 310 have the same curvature, the detection member 30 may be disposed closer to the hologram sheet 20, and a size of the support member 40, which will be described below, may be reduced.

The support member 40 supports the detection member 30 with respect to the hologram sheet 20. The support member 40 according to the present embodiment may be exemplified as various types of support members such as a bracket or a frame that extends from the hologram sheet 20 and is coupled to the detection member 30. The support member 40 may be detachably connected to the hologram sheet 20. Accordingly, a connection position of the support member 40 with respect to the hologram sheet 20 may be freely varied in response to a change in position of the detection member 30.

In a hologram sheet and a hologram display apparatus including the same according to the present disclosure, a display and a hologram sheet are disposed parallel to each other through a prism array, thereby reducing an overall volume.

In addition, in a hologram sheet and a hologram display apparatus including the same according to the present disclosure, a lens array allows a floating image to be positioned at a desired position without adjustment of a distance between a display and a hologram sheet.

Furthermore, in a hologram sheet and a hologram display apparatus including the same according to the present disclosure, since a plurality of microlenses are formed to have different curvatures, a detection member can be disposed at a position close to a hologram sheet, and a size of a support member for supporting the detection member can be reduced.

The present disclosure has been described with reference to embodiments shown in the drawings, but this is merely illustrative, and those skilled in the art will understand that various modifications and other equivalent embodiments are possible therefrom.

Therefore, the true technical protection scope of the present disclosure should be defined by the appended claims.

What is claimed is:

1. A hologram sheet comprising:
a prism array configured to refract light incident from the outside; and
a reflective sheet facing the prism array and configured to reflect the light refracted by the prism array and generate a floating image.

2. The hologram sheet of claim 1, wherein the prism array includes a plurality of microprisms arranged in a first direction on a surface of the reflective sheet.

3. The hologram sheet of claim 2, wherein the plurality of microprisms are parallel to each other.

4. The hologram sheet of claim 2, wherein the plurality of microprisms, respectively, have a triangular cross-sectional shape.

5. The hologram sheet of claim 1, wherein the reflective sheet is configured to generate the floating image in a space opposite the prism array.

6. The hologram sheet of claim 5, wherein the reflective sheet comprises a first reflective member having a first reflective surface, and a second reflective member facing the first reflective member and having a second reflective surface perpendicular to the first reflective surface.

7. The hologram sheet of claim 6, wherein the light refracted by the prism array is incident on the first reflective member in a direction inclined with respect to the first reflective surface.

8. A hologram sheet comprising:
a prism array configured to refract light incident from the outside;
a reflective sheet facing the prism array and configured to reflect the light refracted by the prism array and generate a floating image; and
a lens array facing the reflective sheet and configured to adjust a position of the floating image generated by the reflective sheet.

9. The hologram sheet of claim 8, wherein the prism array comprises a plurality of microprisms arranged in a first direction on a first surface of the reflective sheet, and
the lens array comprises a plurality of microlenses arranged in the first direction on a second surface of the reflective sheet.

10. The hologram sheet of claim 9, wherein the plurality of microlenses are arranged in at least two lines extending along a longitudinal direction of the plurality of microprisms.

11. The hologram sheet of claim 9, wherein the plurality of microlenses, respectively, have a concave shape.

12. The hologram sheet of claim 11, wherein the plurality of microlenses, respectively, have different curvatures.

13. The hologram sheet of claim 12, wherein a respective curvature of the different curvatures of the plurality of microlenses increases or decreases in the first direction.

14. A hologram display apparatus comprising:
a display;
a hologram sheet comprising:
a prism array configured to refract light incident from the display;; and
a reflective sheet facing the prism array and configured to reflect the light refracted from the prism array and generate a floating image; and
a detection member configured to detect a touch input on the floating image.

15. The hologram display apparatus of claim 14, wherein the display is parallel to the reflective sheet.

16. The hologram display apparatus of claim 14, wherein the detection member is configured to radiate detection light to the floating image in a direction parallel to the floating image.

17. The hologram display apparatus of claim 14, wherein the hologram sheet further comprises a lens array facing the reflective sheet and configured to adjust a position of the floating image generated by the reflective sheet.

18. The hologram display apparatus of claim 17, wherein the prism array comprises a plurality of microprisms arranged in a first direction on a first surface of the reflective sheet, and the lens array comprises a plurality of microlenses arranged in the first direction on a second surface of the reflective sheet.

19. The hologram display apparatus of claim 18, wherein the plurality of microlenses, respectively, have a concave shape, and the plurality of microlenses, respectively, have different curvatures.

20. The hologram display apparatus of claim 19, wherein the detection member further comprises a support member inclined with respect to the first direction and configured to support the detection member with respect to the hologram sheet.

* * * * *